United States Patent
Ries et al.

(10) Patent No.: US 9,486,725 B2
(45) Date of Patent: Nov. 8, 2016

(54) SYSTEM AND METHOD FOR FILTERING FUEL WITHIN FUEL TANK

(71) Applicant: Caterpillar Inc., Peoria, IL (US)

(72) Inventors: Jeffrey R. Ries, Metamora, IL (US); Christopher L. Armstrong, Washington, IL (US); John R. Jones, Creve Coeur, IL (US)

(73) Assignee: Caterpillar Inc., Peoria, IL (US)

( * ) Notice: Subject to any disclaimer, the term of this patent is extended or adjusted under 35 U.S.C. 154(b) by 783 days.

(21) Appl. No.: 13/772,910

(22) Filed: Feb. 21, 2013

(65) Prior Publication Data
US 2014/0231366 A1   Aug. 21, 2014

(51) Int. Cl.
*B01D 35/027* (2006.01)
*B01D 29/11* (2006.01)
*B01D 29/58* (2006.01)

(52) U.S. Cl.
CPC ......... *B01D 35/0276* (2013.01); *B01D 29/114* (2013.01); *B01D 29/117* (2013.01); *B01D 29/58* (2013.01)

(58) Field of Classification Search
None
See application file for complete search history.

(56) References Cited

U.S. PATENT DOCUMENTS

| | | | | |
|---|---|---|---|---|
| 1,055,744 A * | 3/1913 | Hans | ..................... | B01D 35/005 210/305 |
| 1,072,371 A * | 9/1913 | Stone | ..................... | B60K 15/06 137/577 |
| 1,083,413 A * | 1/1914 | Smith | ..................... | B01D 36/001 210/313 |
| 1,113,683 A * | 10/1914 | Pfahler | ................ | B01D 36/001 210/172.2 |
| 1,155,070 A * | 9/1915 | Kessler | .................. | B60K 15/04 137/588 |
| 1,177,277 A * | 3/1916 | Schaub | ................. | B01D 35/027 210/172.6 |
| 1,191,741 A * | 7/1916 | Scull | .................... | B01D 35/0273 184/6.24 |
| 1,192,134 A * | 7/1916 | Stevens | ................. | G01F 23/58 137/588 |
| 1,217,732 A * | 2/1917 | Fedders | ................ | F28D 1/0358 123/41.27 |
| 1,394,011 A * | 10/1921 | Hills | ..................... | B01D 35/02 210/172.4 |
| 1,415,217 A * | 5/1922 | Brock | ................... | B60K 15/04 210/172.6 |
| 1,427,619 A * | 8/1922 | Mueller | ............ | B01D 29/0018 210/349 |
| 1,436,294 A * | 11/1922 | Scott | ................... | B60K 15/0406 210/473 |
| 1,451,136 A * | 4/1923 | Allnutt | ................ | F01P 11/0214 137/526 |

(Continued)

FOREIGN PATENT DOCUMENTS

WO   WO 2012173947 A1 * 12/2012 ............. F02M 37/22

*Primary Examiner* — Robert James Popovics
(74) *Attorney, Agent, or Firm* — Miller, Matthias & Hull LLP

(57) ABSTRACT

A system and method for filtering fuel within a fuel tank is disclosed. A dual fuel filtration system may include a first fuel filter connected to a fuel tank opening of the fuel tank, the first fuel filter removing a first type of contaminant from fuel entering the fuel tank opening to obtain a fuel cleared to a first level. The dual fuel filtration system may also include a second fuel filter positioned below the first fuel filter and in fluid communication with a fuel outlet nozzle, the second fuel filter filtering a second type of contaminant from the fuel cleared to the first level to obtain a fuel cleared to a second level passing through the fuel outlet nozzle. The dual fuel filtration system may additionally include an interface portion connecting the first fuel filter and the second fuel filter.

4 Claims, 3 Drawing Sheets

(56) References Cited

U.S. PATENT DOCUMENTS

| | | | | |
|---|---|---|---|---|
| 1,469,937 A * | 10/1923 | Hutchinson | B60K 15/06 | 137/590 |
| 1,493,612 A * | 5/1924 | Denison | B67D 7/68 | 310/87 |
| 1,553,395 A * | 9/1925 | Ressler | A62C 4/00 | 137/493.3 |
| 1,570,461 A * | 1/1926 | Cohn | A62C 4/00 | 220/88.2 |
| 1,581,947 A * | 4/1926 | Hobbs | B01D 35/023 | 210/451 |
| 1,596,362 A * | 8/1926 | McDonald | B01D 35/023 | 210/305 |
| 1,604,048 A * | 10/1926 | Hobbs | B01D 35/023 | 210/172.6 |
| RE16,994 E * | 6/1928 | Cohn | F16K 24/04 | 210/172.6 |
| 1,677,118 A * | 7/1928 | Ford | B01D 23/04 | 210/457 |
| 1,693,741 A * | 12/1928 | Wuest | B01D 29/23 | 210/448 |
| 1,711,093 A * | 4/1929 | Helman | B01D 35/023 | 210/314 |
| 1,757,285 A * | 5/1930 | Anschicks | F16K 17/19 | 210/172.6 |
| 1,814,656 A * | 7/1931 | Anschicks | B65D 25/385 | 210/172.6 |
| 1,862,815 A * | 6/1932 | Buddenbrock | B60K 15/0403 | 220/86.2 |
| 1,953,669 A * | 4/1934 | Bettes | B67D 7/565 | 116/228 |
| 1,976,975 A * | 10/1934 | Williams | B60K 15/0403 | 210/172.6 |
| 2,002,407 A * | 5/1935 | Lemke | B08B 9/0933 | 210/533 |
| 2,010,445 A * | 8/1935 | Sparks | B60K 15/04 | 210/172.6 |
| 2,057,779 A * | 10/1936 | Jacobs | B01D 35/027 | 210/172.3 |
| 2,172,031 A * | 9/1939 | Norman | B01D 35/023 | 210/472 |
| 2,261,915 A * | 11/1941 | Korte | F02M 37/10 | 310/242 |
| 2,351,526 A * | 6/1944 | Lebus | B60K 15/0406 | 210/172.6 |
| 2,370,590 A * | 2/1945 | Taylor | F02M 37/10 | 222/333 |
| 2,524,313 A * | 10/1950 | Gerling | B60K 15/04 | 116/228 |
| 2,733,775 A * | 2/1956 | Dupure | B01D 35/023 | 210/348 |
| 2,770,362 A * | 11/1956 | Paquin | B01D 35/027 | 210/172.4 |
| 2,788,125 A * | 4/1957 | Webb | B01D 35/0273 | 210/172.4 |
| 2,877,903 A * | 3/1959 | Veres | B01D 35/02 | 210/172.4 |
| 2,905,327 A * | 9/1959 | Phillips | B01D 35/027 | 210/449 |
| 2,933,188 A * | 4/1960 | Jacula | B01D 35/027 | 210/172.3 |
| 3,020,950 A * | 2/1962 | Schraivogel | B60K 15/077 | 137/549 |
| 3,061,104 A * | 10/1962 | Schaffner | B01D 35/0273 | 200/16 A |
| 3,171,806 A * | 3/1965 | Schaffner | B01D 35/02 | 210/172.4 |
| 3,186,399 A * | 6/1965 | Peters | B60H 1/2212 | 126/94 |
| 3,266,312 A * | 8/1966 | Coleman | G01F 23/68 | 210/172.4 |
| 3,322,282 A * | 5/1967 | Lyman | A47L 15/4206 | 134/110 |
| 3,487,930 A * | 1/1970 | Rosaen | B01D 35/027 | 210/130 |
| 3,750,889 A * | 8/1973 | Acosta | B01D 29/19 | 210/497.01 |
| 3,905,505 A * | 9/1975 | Gallay | B60K 15/077 | 220/563 |
| 4,077,884 A * | 3/1978 | Naumann | B60K 15/077 | 123/DIG. 2 |
| 4,114,783 A * | 9/1978 | Wempe | B65D 88/54 | 137/590 |
| 4,219,047 A * | 8/1980 | Polley | B65D 88/54 | 137/125 |
| 4,259,184 A * | 3/1981 | D'Arnal | A61J 1/05 | 141/329 |
| 4,326,641 A * | 4/1982 | Wilken | B60K 15/0403 | 141/392 |
| 4,618,422 A * | 10/1986 | Sasaki | B01D 29/15 | 210/172.3 |
| 4,640,771 A * | 2/1987 | Whalen | B01D 29/15 | 210/167.01 |
| 4,747,388 A * | 5/1988 | Tuckey | B60K 15/077 | 123/510 |
| 4,851,118 A * | 7/1989 | Kurihara | B01D 29/15 | 210/315 |
| 4,853,125 A * | 8/1989 | Hanabusa | B01D 29/23 | 210/172.2 |
| 4,860,805 A * | 8/1989 | Townsend | A47C 27/085 | 141/286 |
| 4,861,478 A * | 8/1989 | Hall | B01D 35/04 | 141/286 |
| 4,908,130 A * | 3/1990 | Lynne | B01D 29/117 | 210/172.6 |
| 5,025,946 A * | 6/1991 | Butkovich | B67D 7/344 | 220/86.3 |
| 5,052,437 A * | 10/1991 | Danna | B60K 15/035 | 137/577 |
| 5,236,000 A * | 8/1993 | Kizer | B60K 15/077 | 137/38 |
| 5,249,594 A * | 10/1993 | Kizer | B60K 15/077 | 137/15.08 |
| 5,312,545 A * | 5/1994 | Starin | B01D 35/027 | 210/172.6 |
| 5,494,084 A * | 2/1996 | Moore | B67D 7/32 | 137/588 |
| 5,505,849 A * | 4/1996 | Rama, Jr. | B01D 29/27 | 210/172.6 |
| 5,520,802 A * | 5/1996 | Brubaker | B01D 35/027 | 210/172.6 |
| 5,776,341 A * | 7/1998 | Barnard | B01D 29/114 | 210/306 |
| 5,795,468 A * | 8/1998 | Reising | B01D 29/15 | 210/172.4 |
| 5,924,445 A * | 7/1999 | Ambrose | B01D 29/213 | 137/549 |
| 6,105,787 A * | 8/2000 | Malkin | B01D 29/15 | 210/457 |
| 6,176,260 B1 * | 1/2001 | Hahner | B60K 15/077 | 123/468 |
| 6,279,751 B1 * | 8/2001 | Malkin | B01D 29/15 | 210/457 |
| 6,371,153 B1 * | 4/2002 | Fischerkeller | B60K 15/00 | 123/509 |
| 6,500,338 B2 * | 12/2002 | Baah | B01D 15/00 | 210/266 |
| 6,596,174 B1 * | 7/2003 | Marcus | B01D 36/003 | 210/104 |
| 6,858,134 B2 * | 2/2005 | Yates | B01D 29/21 | 210/167.01 |
| 6,953,527 B2 * | 10/2005 | Brower | B01D 36/003 | 210/172.2 |
| 6,974,537 B2 * | 12/2005 | Abdelqader | B01D 29/018 | 210/104 |
| 7,059,305 B2 * | 6/2006 | Knaggs | B60K 15/03519 | 123/509 |
| 7,069,913 B1 * | 7/2006 | Crary | F02M 37/0052 | 123/509 |
| 7,134,568 B2 * | 11/2006 | Moriyama | B60K 15/077 | 210/251 |
| 7,329,339 B2 * | 2/2008 | Kimisawa | B01D 29/15 | 210/136 |

(56) References Cited

U.S. PATENT DOCUMENTS

| | | | | |
|---|---|---|---|---|
| 7,429,322 B2* | 9/2008 | Fujita | B01D 17/00 | 210/172.4 |
| 7,901,572 B2* | 3/2011 | Sato | B01D 35/0273 | 210/172.4 |
| D637,698 S * | 5/2011 | Greene | D23/268 | |
| 7,964,096 B2* | 6/2011 | Kimisawa | F02M 37/025 | 123/509 |
| 8,029,667 B2* | 10/2011 | Santinon | B60K 15/04 | 210/172.6 |
| 8,137,546 B2* | 3/2012 | Ogose | B01D 35/0273 | 210/172.4 |
| 8,173,013 B2* | 5/2012 | Sato | B01D 35/0273 | 210/172.4 |
| 8,372,278 B1* | 2/2013 | Nguyen | B01D 35/0273 | 123/196 A |
| 8,496,821 B2* | 7/2013 | Ringenberger | B01D 29/111 | 210/232 |
| 8,580,111 B2* | 11/2013 | Partridge | B01D 61/36 | 123/3 |
| 8,715,497 B2* | 5/2014 | Schnipke | B01D 35/0273 | 210/172.2 |
| 8,739,821 B2* | 6/2014 | Murabayashi | B60K 15/077 | 123/509 |
| 8,944,268 B2* | 2/2015 | Murabayashi | B60K 15/077 | 123/509 |
| 8,955,545 B2* | 2/2015 | Murabayashi | F02M 37/0094 | 123/514 |
| 9,080,537 B2* | 7/2015 | Choi | F02M 37/106 | |
| 9,162,564 B2* | 10/2015 | Sakamoto | B60K 15/03 | |
| 9,222,487 B2* | 12/2015 | Alioto | F15B 1/26 | |
| 9,248,390 B2* | 2/2016 | Hudgens | B01D 29/56 | |
| 2001/0045222 A1* | 11/2001 | Hultqvist | B01D 35/027 | 134/22.18 |
| 2002/0083983 A1* | 7/2002 | Coha | F02M 37/0094 | 137/565.22 |
| 2002/0162777 A1* | 11/2002 | Baah | B01D 15/00 | 210/85 |
| 2004/0159602 A1* | 8/2004 | Brower | B01D 36/003 | 210/295 |
| 2005/0023201 A1* | 2/2005 | Sato | B01D 35/0273 | 210/172.4 |
| 2005/0029173 A1* | 2/2005 | Kimisawa | B01D 29/15 | 210/136 |
| 2005/0029180 A1* | 2/2005 | Kimisawa | B01D 29/15 | 210/172.4 |
| 2005/0109685 A1* | 5/2005 | Fujita | B01D 17/00 | 210/172.2 |
| 2006/0016741 A1* | 1/2006 | Moriyama | B60K 15/077 | 210/172.3 |
| 2006/0191832 A1* | 8/2006 | Richie | B01D 29/21 | 210/171 |
| 2008/0127948 A1* | 6/2008 | Braun | B60K 15/077 | 123/510 |
| 2008/0197060 A1* | 8/2008 | Girondi | B01D 29/114 | 210/86 |
| 2010/0193415 A1* | 8/2010 | Nagai | B01D 29/114 | 210/91 |
| 2011/0036763 A1* | 2/2011 | Santinon | B60K 15/04 | 210/232 |
| 2011/0132825 A1* | 6/2011 | Nishio | F02M 37/10 | 210/172.4 |
| 2011/0290793 A1* | 12/2011 | Murabayashi | B60K 15/077 | 220/4.14 |
| 2012/0118401 A1* | 5/2012 | Murabayashi | B60K 15/077 | 137/123 |
| 2012/0312759 A1* | 12/2012 | Ries | B01D 35/0276 | 210/806 |
| 2013/0193083 A1* | 8/2013 | Kamp | B01D 35/30 | 210/767 |
| 2013/0206663 A1* | 8/2013 | Ito | B01D 35/0273 | 210/172.4 |
| 2014/0183112 A1* | 7/2014 | Ahmad | F02M 37/0023 | 210/130 |
| 2014/0224215 A1* | 8/2014 | Lehman | F02M 37/22 | 123/446 |
| 2014/0230315 A1* | 8/2014 | Ries | B01D 35/0276 | 44/300 |
| 2014/0231366 A1* | 8/2014 | Ries | B01D 35/0276 | 210/806 |
| 2014/0284286 A1* | 9/2014 | Ries | F02M 37/22 | 210/808 |
| 2015/0198071 A1* | 7/2015 | Hudgens | B01D 29/56 | 210/805 |

* cited by examiner

SYSTEM AND METHOD FOR FILTERING FUEL WITHIN FUEL TANK

TECHNICAL FIELD OF THE DISCLOSURE

The present disclosure relates to fuel systems and, more particularly, relates to filtration employed in fuel systems for cleaning fuel within a fuel tank.

BACKGROUND OF THE DISCLOSURE

Fuel system contamination can cause serious problems in any engine. Modern high-performance, low-emissions models are especially vulnerable to contaminants. Generally speaking, fuel contaminants can be described as small to microscopic particles suspended in any fuel that are typically measured in units called microns. One micron is equivalent to one-millionth of a meter. Various types of contaminants can be found in fuel. For example, dirt and dust can be present, which can cause fungi growth and cloudiness. Rust can accumulate in fuel flowing through rusted hoses and fuel lines corroding or clogging components, such as, injectors and control valves of an engine. Excessive water in fuel can cause algae formation while certain extraneous particulates can affect fuel stability.

Such contaminants in fuel are common and can cause premature engine wear, reduce component life, reduce performance and even cause sudden engine failure. As critical components wear prematurely, engine power drops off, fuel consumption rises, emissions increase and the odds of a costly breakdown rise dramatically. In at least some occasions, contaminants can be as abrasive as the materials used to machine parts in the manufacturing process of an engine. Accordingly, alleviating or possibly even completely eliminating contamination from fuel before fuel reaches the engine is highly desirable. These issues may be particularly acute in remote locales where fuel is stored on construction sites to power construction equipment or in nations or regions where fuel quality guidelines are either not stringent or are loosely enforced.

While the effects of dirty fuel can be minimized by using proper storage, handling, maintenance and service processes, such methods are often not followed, or even if followed may not be sufficient and may need to be augmented by other procedures. Techniques for minimizing and/or removing contaminants in fuel have been proposed in the past. One technique employs specialized external pumps for cleaning and filtering fuel before fuel even enters a fuel tank for combustion and/or storage. Although this technique may be effective in removing some contaminants, not all contaminants are removed, which may nonetheless find their way into the fuel tank. Furthermore, more contaminants may accumulate in the fuel from the point of filtration up to the point of the fuel entering the fuel tank. Contaminants may even accumulate in the fuel stored within the fuel tank, due to corrosion of the fuel tank walls and other components thereof, or contaminants entering the fuel tank when the fuel tank cap is opened. Such contaminants may find their way through the fuel line into the engine and may cause at least some of the problems mentioned above.

Accordingly, it would be advantageous if an improved filtration system that removed contaminants before fuel reached the engine were developed.

SUMMARY OF THE DISCLOSURE

In accordance with one aspect of the present disclosure, a dual fuel filtration system is disclosed. The dual fuel filtration system may include a first fuel filter connected to a fuel tank opening of a fuel tank, the first fuel filter removing a first type of contaminant from fuel entering the fuel tank opening to obtain a fuel cleared to a first level. The dual filtration system may also include a second fuel filter positioned below the first fuel filter and in fluid communication with a fuel outlet nozzle, the second fuel filter filtering a second type of contaminant from the fuel cleared to a first level to obtain a fuel cleared to a second level passing through the fuel outlet nozzle. The dual filtration system may additionally include an interface portion connecting the first fuel filter and the second fuel filter.

In accordance with another aspect of the present disclosure, a method of filtering fuel is disclosed. The method may include providing (a) a first fuel filter connected to a fuel tank opening of a fuel tank; (b) a second fuel filter in fluid communication with a fuel outlet nozzle of the fuel tank; and (c) an interface portion connecting the first fuel filter with the second fuel filter and assembling the first fuel filter and the second fuel filter within the fuel tank. The method may also include pouring fuel through the fuel tank opening of the fuel tank, filtering the fuel through the first fuel filter in an inside-out flow path to obtain a fuel cleared to a first level and filtering the fuel cleared to the first level through the second fuel filter in an outside-in flow path to obtain a fuel cleared to a second level.

In accordance with yet another aspect of the present disclosure, a fuel system is disclosed. The fuel system may include a fuel tank having a fuel tank body and a fuel tank opening. The fuel system may also include a first fuel filter positioned about the fuel tank opening, a second fuel filter positioned beneath the first fuel filter within the fuel tank body and in fluid communication with a fuel outlet nozzle and an interface portion connecting the first fuel filter and the second fuel filter.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION OF THE DISCLOSURE

A fuel system having a fuel tank and fuel filters for filtering fuel are disclosed. While not exclusive, such a fuel system can be effectively employed in various machines used in construction, earth moving, and agriculture fields, including but not limited to track-type tractors, excavators, graders, rollers, off-highway trucks, pipe layers and loaders.

Figure 1:
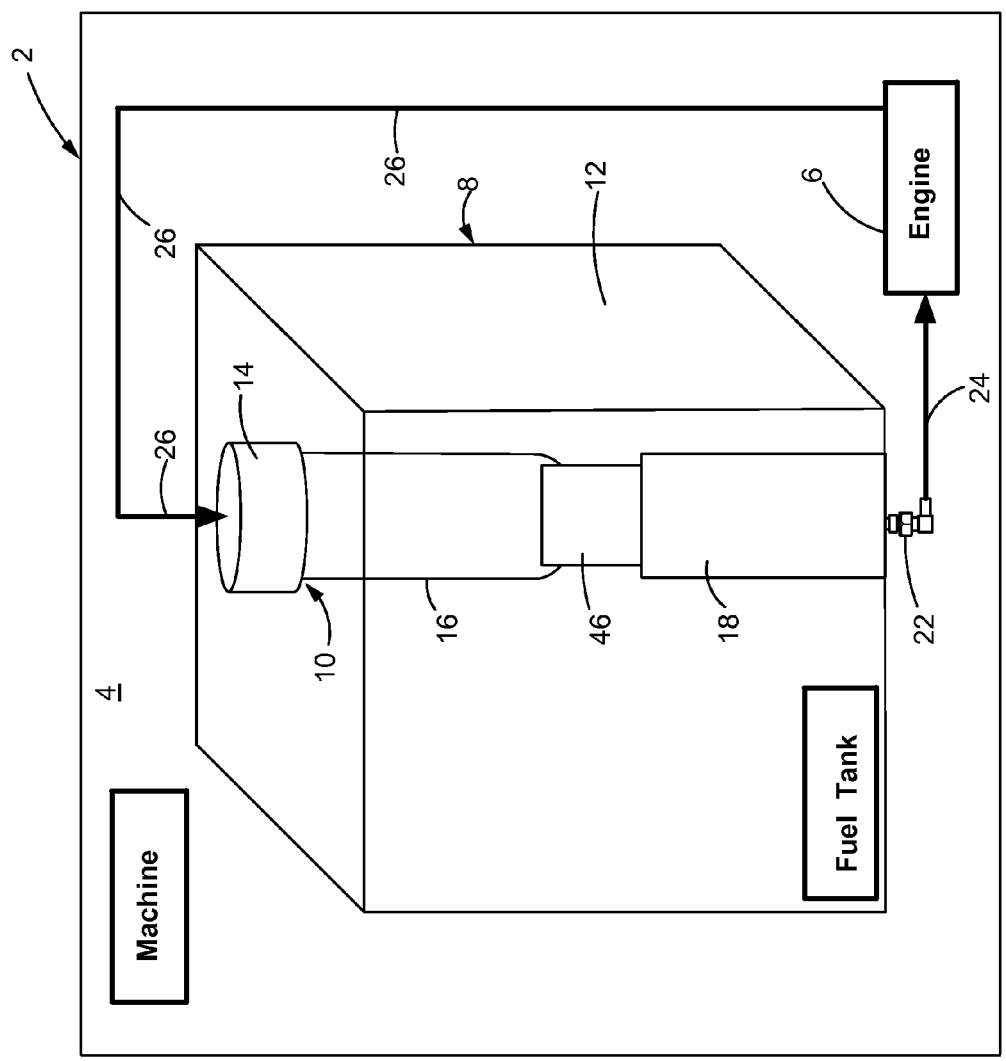
FIG. 1 is a schematic view of a machine having a fuel tank employing a first fuel filter and a second fuel filter, in accordance with at least some embodiments of the present disclosure.

Referring now to FIG. 1, a fuel system 2 is shown, in accordance with at least some embodiments of the present disclosure. As shown, the fuel system 2 may be part of a machine 4 having an engine 6 and a fuel tank 8. The machine 4 may be any of a variety of machines, such as those mentioned above, while the engine 6 may be any of diesel engines, internal combustion engines, hybrid engines, and the like, that are commonly employed in machines, such as the machine 4.

With respect to the fuel tank 8, it may be a stand-alone structure or, as shown, it may be mounted in or on a machine (e.g., the machine 4), such as but not limited to those listed above. While all of the components of the fuel tank 8 have not been shown in FIG. 1, a typical fuel tank of the type that may be employed with the machine 4 for purposes of the present disclosure may include a fuel tank opening 10 for filling (through a fuel nozzle, not shown) and storing fuel within a fuel tank body 12. The fuel tank opening 10 may be covered and protected by a fuel tank cap 14. The fuel tank 8 may additionally employ a first fuel filter 16 and a second fuel filter 18, each of which is described in greater detail further below, for removing contaminants from the fuel within the fuel tank 8.

Furthermore, the shape, size and material of the fuel tank 8 may vary depending upon the application of the fuel tank. For example, in one embodiment, the fuel tank 8 may be seven hundred and sixty millimeters (760 mm) long, six hundred and thirty millimeters (630 mm) wide and eight hundred and sixty two millimeters (862 mm) deep. In other embodiments, the size of the fuel tank 8 may vary. Moreover, and as mentioned above, the fuel tank 8 may be representative of a variety of fuel tanks, such as, in-machine fuel tanks, above-ground or under-ground bulk storage stationary fuel tanks employed on construction sites, tanker trucks in aviation, marine and other commercial transportation fleet re-fueling, etc. The fuel tank 8, whether in-machine or bulk storage, may be employed for storing fuels, such as, gasoline, diesel fuel, kerosene or any other type of liquid fuel that may require filtration.

Relatedly, the configuration and, particularly, the shape and size of the fuel tank opening 10 and the fuel tank cap 14, as well as the manner of securing the fuel tank cap to the fuel tank opening may vary depending upon several factors, such as, the type of the fuel tank 8, the type of fuel stored within the fuel tank, the shape and size of the nozzle employed for filling fuel through the fuel tank opening, the shape and size of the machine 4 using the fuel tank, etc. For example, in some embodiments, the fuel tank opening 10 may be provided with external threads on a neck portion thereof, which may be designed to mate and lock with corresponding internal threads on the fuel tank cap 14. In other embodiments, the fuel tank opening 10 may have friction nubs and the fuel tank cap 14 may be frictionally snapped to the fuel tank opening. In alternate embodiments, other commonly employed mechanisms for securing the fuel tank cap 14 to the fuel tank opening 10 may be employed.

In addition to the fuel tank opening 10 and the fuel tank cap 14, the fuel tank 8 and particularly, the fuel tank body 12 of the fuel tank may be equipped with several other components, such as, a fuel sensor 20 (shown in two positions in FIG. 2) for sensing the level of the fuel within the fuel tank body 12. Various vents, gauges, hose assemblies, nozzles etc. may additionally be employed. Although these components are not shown and/or fully described, they are contemplated in combination or conjunction with the fuel tank 8 and are considered within the scope of the present disclosure. Moreover, it will be understood that portions of the fuel tank body 12 have been shown as transparent merely for explanation purposes. Although the fuel tank body (or portions thereof) 10 may indeed be transparent, this need not and likely is not the case. In at least some embodiments, the fuel tank body 12 (or portions thereof) may be opaque or translucent.

Figure 2:
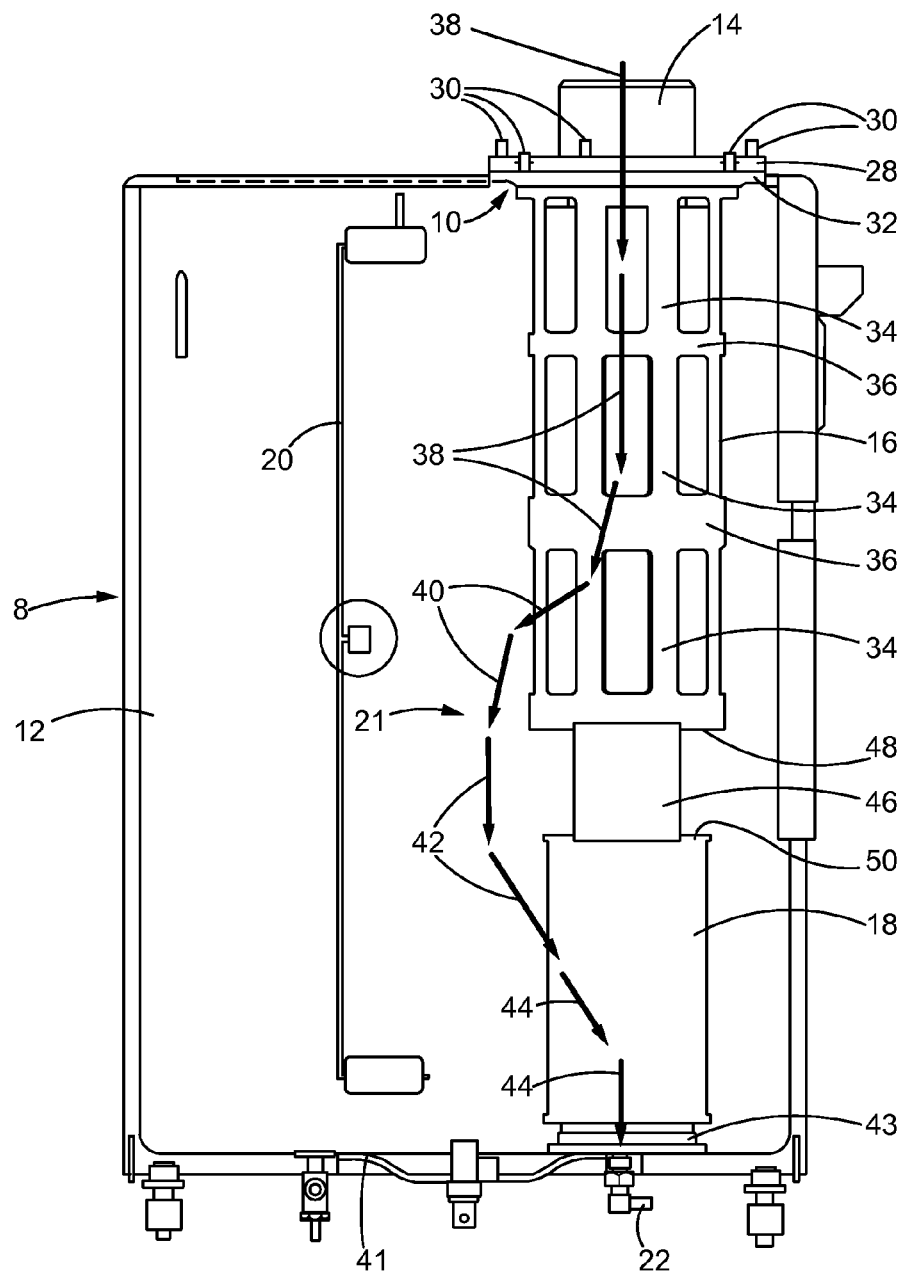
FIG. 2 is a schematic front view of a portion of the fuel tank of FIG. 1 showing the first and the second fuel filters in greater detail.

Referring now to FIG. 1 in conjunction with FIG. 2, a fuel filtration system 21 employed within the fuel tank 8 is shown, in accordance with at least some embodiments of the present disclosure. FIG. 2 in particular shows a schematic front view of a portion of the fuel tank 8 of FIG. 1, illustrating the fuel filtration system 21 in greater detail. The fuel filtration system 21 in particular is a dual fuel filtration system employing the first fuel filter 16 and the second fuel filter 18 for filtering fuel. With specific reference to the first and the second fuel filters 16 and 18, respectively, each of those fuel filters may be employed for filtering fuel within the fuel tank 8. Specifically, the first fuel filter 16 may be employed for a first level of filtering fuel as it comes in through the fuel tank opening 10, while the second fuel filter 18 may be employed for a second level of filtering fuel received from the first level as the fuel leaves the fuel tank 8. Thus, the present disclosure provides a provision for the dual-filtration system, mentioned above, for filtering both, incoming and outgoing fuel. The filtered fuel (after the second round of filtering by the second fuel filter 18) may egress from the fuel tank 8 via a fuel outlet nozzle 22 through a fuel line 24 to the engine 6 for combustion. After combustion, any remaining non-combusted fuel may be returned to the fuel tank 8 via a return fuel line 26 for re-filtration and re-combustion.

It will be understood that while the fuel outlet nozzle 22 has been shown as being present at the bottom of the fuel tank body 12, this need not always be the case. Rather, the positioning of the fuel outlet nozzle 22 may vary depending upon the positioning of the second fuel filter such that only fuel filtered through the second fuel filter enters the fuel outlet nozzle. Also, while the return fuel line 26 has been shown as returning fuel from the engine 6 to the fuel tank opening 10, this is only exemplary. In other embodiments, the return fuel line 26 may fluidly connect with the fuel tank 8 in a separate location and the retuned fuel may or may not be filtered through the first fuel filter 16.

Relatedly, the positioning, shape and size of each of the first and the second fuel filters 16 and 18, respectively, may vary in other embodiments. For example, the shape and size of the respective first and the second fuel filters 16 and 18 may vary depending upon the shape, size and capacity of the fuel tank 8, as well the filtering capacity of each of those fuel filters. Similarly, although the second fuel filter 18 has been shown as being positioned substantially in-line below the first fuel filter 16, in at least some embodiments, other positioning configurations are contemplated and considered within the scope of the present disclosure. Although the second fuel filter 18 may be positioned beneath the first fuel filter 16, in at least some embodiments, this need not be the case as long as the incoming fuel passes first through the first fuel filter before entering the fuel tank 8 and then passes through the second fuel filter 18 before egressing from the fuel tank.

With respect to the first fuel filter 16, in at least some embodiments, the first fuel filter may be fitted to the fuel tank opening 10 and/or the fuel tank cap 14 and may extend within the fuel tank body 12, such that any fuel entering the fuel tank opening enters and passes through the first fuel filter before entering the fuel tank body. In at least some embodiments, the first fuel filter 16 may be connected to the fuel tank opening 10 by way of a flange 28 positioned about the fuel tank opening. Specifically, the first fuel filter 16 may be bolted to the flange 28, which in turn may then be positioned about the fuel tank opening 10, such that the first fuel filter extends within the fuel tank opening into the fuel tank body 12, and bolted to the surface of the fuel tank body by bolts 30. A sealing mechanism 32 may also be provided between the surface of the fuel tank 8 and the flange 28 for providing a tight leak-proof seal. In other embodiments, other mechanisms for connecting the first fuel filter 16 to the fuel tank opening 10 may be employed.

Furthermore, in at least some embodiments, the first fuel filter 16 may be a cylindrical filter constructed of a high efficiency cellulosic or synthetic medium to filter and clean particles of dust, debris, and other larger contaminants from the fuel entering the fuel tank 8 through the fuel tank opening 10. The first fuel filter 16 may have an outer pleated surface 34 and radial beading 36. The pleated surface 34 may provide improved filtration while the radial beading 36 may assist in maintaining the stability and spacing of the pleated surface during and after the filtering operation and, may additionally prevent bunching of the pleats thereof, thereby maximizing the efficiency, capacity and life of the first fuel filter 16. Additionally, depending upon the size of the contaminants desired to be filtered by the first fuel filter 16, the rating of the filter media employed within the first fuel filter may vary. For example, in some embodiments, the first fuel filter 16 may be an 87.5% efficiency filter. In other embodiments, other ratings for the first fuel filter 16 may be employed.

Moreover, the first fuel filter 16 may either be a disposable fuel filter that may be occasionally replaced for continual filtration or, alternatively, the first fuel filter may be a reusable fuel filter, such as a centrifugal filter, that may be occasionally removed, cleaned and installed back into position for filtration. In at least some other embodiments, the first fuel filter 16 may be a bag style filter or a sock style filter as well. The first fuel filter 16, whether disposable or re-usable, may provide filtration in an inside-out flow path. In other words, incoming fuel from the fuel tank opening 10 may be pulled (e.g., directed) into the body of the first fuel filter 16, as shown by arrows 38 and may be filtered as the fuel exits the first fuel filter (from an inner surface to an outer surface thereof) into the fuel tank 8 for storage, as shown by arrows 40. Thus, the flow of fuel through the first fuel filter 16 is uni-directional, that is, from inside the first fuel filter to the outside thereof. By virtue of providing such an inside-out flow path of filtering fuel, several advantages may be afforded.

First, any contamination that is removed from the incoming fuel is trapped within the first fuel filter 16 without any danger of that contamination mixing back into the fuel within the fuel tank 8. Secondly, as the first fuel filter 16 is removed from the fuel tank 8 for cleaning and/or replacing, any contamination that is trapped within the first fuel filter remains safely trapped inside even if the fuel tank 8 is filled completely with fuel, thereby preventing releasing (e.g., purging) of the contaminants back into the fuel.

Likewise, the second fuel filter 18 may be employed for removing any contaminants that remain in the incoming fuel after passing through the first fuel filter 16. Similar to the first fuel filter 16, the second fuel filter 18 may also be a cylindrical, disposable or reusable filter with a high efficiency filter media that may be capable of filtering finer particulates from the fuel. In at least some embodiments, the second fuel filter 18 may be a 99.5% efficiency filter although, in other embodiments, other ratings of the second fuel filter may be employed depending upon the size of the contaminants involved. Although not shown, the second fuel filter 18 may also have a pleated surface and radial beading for improved filtration. Furthermore, the second fuel filter 18 may have a water separation capability for separating water from the fuel or alternatively, a separate water separator (not shown) may be employed in conjunction or combination with one or both of the first and the second fuel filters 16 and 18, respectively. A water drain (not shown) may be provided on the fuel tank body 12 for removing any water that is separated.

Additionally, the second fuel filter 18 may be connected, in at least some embodiments, onto a bottom floor portion 41 of the fuel tank body 12 by way of a flange portion 43. The second fuel filter 18 may be threadingly connected to the flange portion 43 or, alternatively, may be frictionally snapped thereon. In other embodiments, other mechanisms to connect the second fuel filter 18 within the fuel tank body 12 may be employed. Furthermore, as mentioned above, the second fuel filter 18 need not always be positioned as shown and, particularly, need not always be positioned on the bottom floor portion 41 as shown. Other positioning configurations that permit filtering of the fuel may be employed.

In contrast to the first fuel filter 16 which filters fuel in an inside-out flow, the second fuel filter 18 may filter fuel in an outside-in flow. In other words, fuel filtered from the first fuel filter 16 may enter through an outside surface of the second fuel filter from the fuel tank 8 into an inside surface of the second fuel filter, such that as the fuel flows from the outside to the inside of the second fuel filter, any remaining contamination is trapped within the body of the second fuel filter. The outside-in flow of the second fuel filter 18 is shown by way of arrows 42. From the inside of the second fuel filter 18, the filtered fuel may exit the fuel tank 8 through the fuel outlet nozzle 22 fluidly connected to the second fuel filter, as shown by arrows 44. Thus, the flow of fuel through the second fuel filter 18 is also uni-directional, but in contrast to the first fuel filter 16 in which the uni-directional flow is inside-out, the uni-directional flow of the second fuel filter is outside-in. Furthermore, the arrows 40 and 42 also represent a fuel cleared to a first level after passing through the first fuel filter 16 and the arrows 44 also represent a fuel cleared to a second level after passing through the second fuel filter 18.

In addition to all of the foregoing, the shape and size of each of the first and the second fuel filters 16 and 18, respectively, may vary. Although both of the filters have been shown as being cylindrical and are likely to be cylindrical, this need always be the case. Further, the width of each of the first and the second fuel filters 16 and 18, respectively, may be such that they may be easily installed and removed through the fuel tank opening 10. Moreover, although FIGS. 1 and 2 show the first fuel filter 16 as being bigger in size than the second fuel filter 18, such a representation is merely exemplary. As stated above, the shape, size and capacity of each of the first fuel filter 16 and the second fuel filter 18 may vary in other embodiments.

Furthermore, the first fuel filter 16 may be connected to the second fuel filter via an interface portion 46. Generally speaking, the interface portion 46 may be composed of any of variety of materials that are suited for being used within the fuel tank 8, such as, a corrosion resistant material. In at least some embodiments, the interface portion 46 may also be imparted a filtering capability similar to the first and the second fuel filters 16 and 18, respectively. The method of connecting the interface portion 46 to each of the first fuel filter 16 and the second fuel filter 18 may vary. For example, in some embodiments, the interface portion 46 may be inserted (e.g., frictionally) into a bottom surface 48 of the first fuel filter 16, as well as into a top surface 50 of the second fuel filter 18 for connecting those fuel filters together in relation to one another. In other embodiments, other mechanisms, such as, bolts, screws, adhesives, threads, etc., may be employed for connecting the first fuel filter 16 and the second fuel filter 18 together via the interface portion 46.

By virtue of connecting the first fuel filter 16 to the second fuel filter 18 via the interface portion 46, the first and the second fuel filters may be held in a steady and stable position within the fuel tank 8. Installing and removing those filters from the fuel tank 8 may also be eased by providing the interface portion 46. Removing (or installing) the first fuel filter 16 from (or into) the fuel tank 8 automatically removes (or installs) the second fuel filter as well, thereby avoiding the need to use any additional mechanism for installing and removing the second fuel filter. Thus, when either the first fuel filter 16 or the second fuel filter 18 is to be removed from the fuel tank 8 for either cleaning or replacement, the flange 28 may be opened (e.g., by unscrewing the bolts 30) and pulled up. As the flange 28 is pulled up, the first fuel filter 16, which is connected to the flange is also pulled up, pulling the second fuel filter 18 therealong. When connecting the second fuel filter 18 to the flange portion 43 during installation, the interface portion 46 may steadily guide the second fuel filter to connect with the flange portion.

INDUSTRIAL APPLICABILITY

In general, a filtration system for filtering fuel within a fuel tank in a fuel system is described above. The filtration system may include a first fuel filter positioned at a fuel tank opening for filtering dirt and contamination as fuel enters the fuel tank in an inside-out flow, as well as a second fuel filter positioned on an exit of the fuel tank to filter any remaining contaminants from the fuel as it leaves the fuel tank in an outside-in flow. The first and the second fuel filters may be connected to one another by way of an interface portion.

Figure 3:
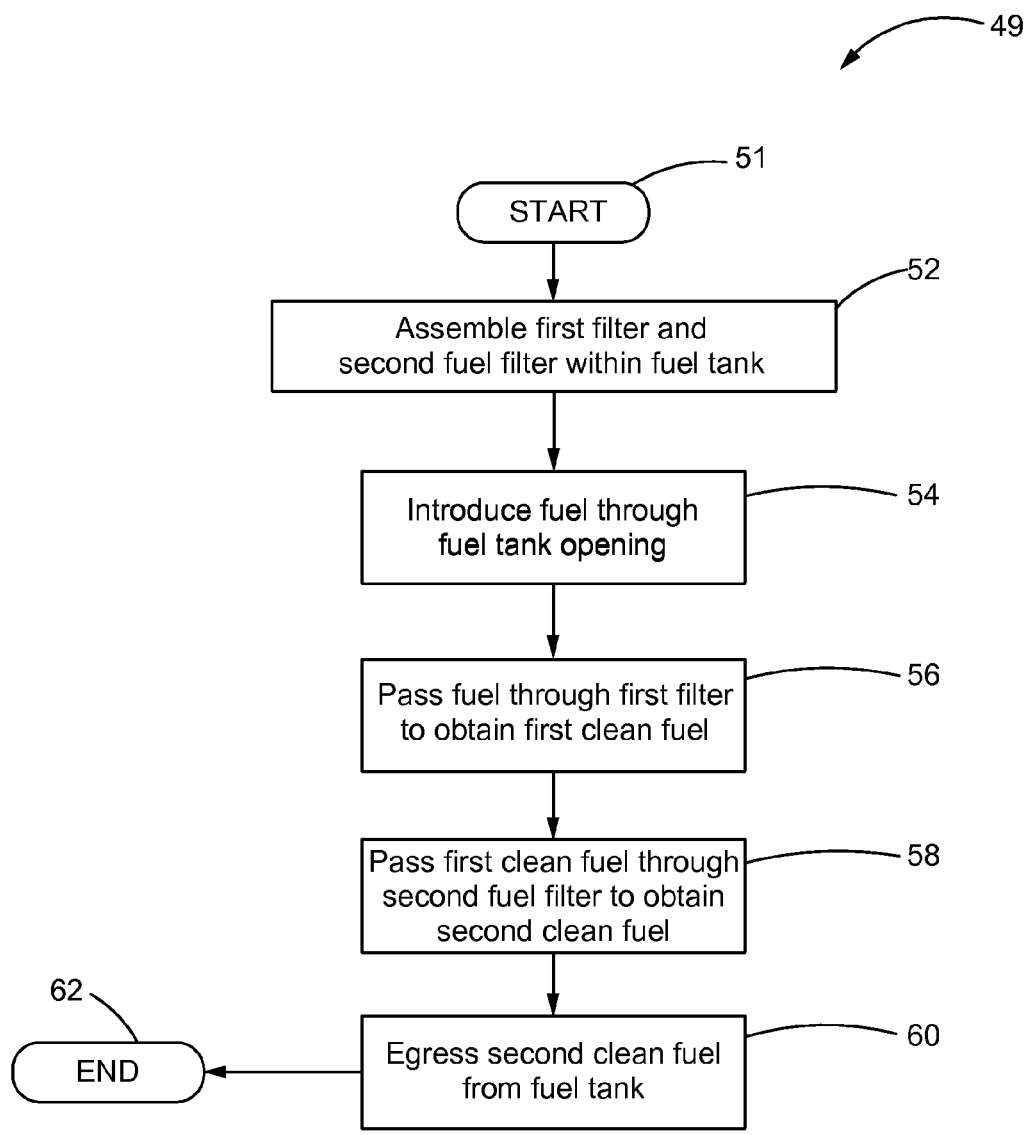
FIG. 3 is a flowchart showing a method of filtering fuel through the first and the second fuel filters of FIG. 2.

A method 49 of filtering fuel entering the fuel tank 8 is shown with respect to FIG. 3. After starting at a step 51, the first fuel filter 16 and the second fuel filter 18 may first be assembled within the fuel tank 8 at a step 52. As described above, the first fuel filter 16 may be connected to the fuel tank opening 10 such that any fuel entering the fuel tank opening automatically enters through the first fuel filter. Relatedly, the second fuel filter 18 may be assembled (or installed) within the fuel tank 8, for example, on the bottom floor portion 41 of the fuel tank body 12 by way of the flange portion 43. The interface portion 46 may additionally be employed for connecting the first fuel filter 16 to the second fuel filter 18.

Subsequent to assembling the first and the second fuel filters 16 and 18, respectively, within the fuel tank 8 at the step 52, the fuel desired to be stored within the fuel tank is pumped, poured or otherwise introduced through the fuel tank opening 10 at a step 54. Next, at a step 56, the entering fuel is passed through the first fuel filter 16 to perform a first round of filtering to remove a first type of contamination from the incoming fuel to obtain the fuel cleared to the first level (as represented by the arrows 40 and 42). The first type of contamination may be dust, dirt, debris, rock, algae, rust, or any other contaminants depending upon the rating of the first fuel filter. By virtue of connecting the first fuel filter 16 to the fuel tank opening 10, any fuel coming into the fuel tank 8 is automatically passed through the first fuel filter in an inside-out flow, as described above. The fuel cleared to the first level is then passed through the second fuel filter 18 at a step 58 to obtain the fuel cleared to the second level (as represented by the arrows 44).

As described above, the second fuel filter 18 filters the first clean fuel in an outside-in flow such that the first clean fuel is filtered as it is pulled into the second fuel filter. Thus, any incoming fuel into the fuel tank 8 undergoes a two-step filtration process: first through the first fuel filter 16 and then through the second fuel filter 18. The clean fuel (e.g., the fuel cleared to the second level) then egresses the fuel tank 8 through the fuel outlet nozzle 22 at a step 60. In particular, the filtered fuel from the fuel outlet nozzle 22 flows via the fuel line 24 into the engine 6 for combustion. After combustion in the engine 6, any non-combusted fuel is returned to the fuel tank 8 via the return fuel line 26 for re-filtration and re-combustion, as outlined above by the steps 56-60. In at least some embodiments, the return fuel from the return fuel line 26 may not pass through the first fuel filter 16 and may only pass through the second fuel filter 18 for filtration in which case only the steps 58 and 60 may be repeated. The process then ends at a step 62.

It will be understood that although the steps 54, 56 and 58 of pouring fuel and passing fuel through the first fuel filter 16 and the second fuel filter 18, respectively, have been described above as happening one after another, there may not necessarily be a time lag between those steps. Rather, those steps may happen simultaneously such that the fuel may be continuously poured though the fuel tank opening and filtered through the strainer and the fuel filter.

Thus, by virtue of providing the first and the second fuel filters, and positioning those filters at the incoming as well as the outgoing ends, respectively, of the fuel tank, any incoming fuel may be automatically filtered before storing and/or supplying that fuel for combustion in an engine of a machine or the like. Positioning the fuel filters within the fuel tank advantageously makes the fuel filters invisible to a customer when filling the fuel tank, consumes less space compared to conventional external fuel filters, performs filtering without the requirement of any pumps or other special equipment, are simple to maintain and economical to use. Accordingly, the present disclosure provides a high efficiency, durable and inexpensive filtering mechanism for filtering fuel to alleviate (or possibly even completely eliminate) contaminants from the fuel, thereby improving fuel stability as well as increasing the performance and reliability of engines employing the filtered fuel.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A fuel system, comprising:
a fuel tank having an inlet opening in an upper portion of thereof and an outlet opening in a lower portion thereof;
a first fuel filter positioned within the fuel tank, connected to said fuel tank about a perimeter of said inlet opening, said first fuel filter having an interior for receiving fuel flowing through said inlet opening, said fuel passing from said interior, through said first fuel filter and into said fuel tank;
an interface portion; and
a second fuel filter positioned within said fuel tank, connected to said first fuel filter by said interface portion, and positioned axially beneath the first fuel filter, said second fuel filter connected to said fuel tank about a perimeter of said outlet opening, wherein fuel within said fuel tank passes through said second fuel filter and through said outlet opening, for passage to, and consumption by, an engine.

2. The fuel system of claim 1, wherein the first fuel filter comprises a filter media having a pleated surface and radial beading.

3. The fuel system of claim 1, wherein the first fuel filter is a re-usable centrifugal filter.

4. The fuel system of claim 1, wherein the second fuel filter has a water separating capability.

* * * * *